United States Patent
Lee

(10) Patent No.: US 8,900,025 B2
(45) Date of Patent: Dec. 2, 2014

(54) LIQUID CRYSTAL DISPLAY DEVICE AND METHOD OF MANUFACTURING THE SAME

(75) Inventor: Hyun-Shik Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 40 days.

(21) Appl. No.: 13/335,038

(22) Filed: Dec. 22, 2011

(65) Prior Publication Data

US 2013/0070182 A1    Mar. 21, 2013

(30) Foreign Application Priority Data

Sep. 19, 2011   (KR) ................ 10-2011-0094284

(51) Int. Cl.
| | | |
|---|---|---|
| *H01J 9/00* | (2006.01) | |
| *H01J 9/24* | (2006.01) | |
| *G02B 6/42* | (2006.01) | |
| *F21V 8/00* | (2006.01) | |

(52) U.S. Cl.
CPC ............ *H01J 9/24* (2013.01); *G02B 6/4212* (2013.01); *G02B 6/0091* (2013.01); *G02B 6/0081* (2013.01); *G02B 6/0093* (2013.01)
USPC ............... 445/24; 362/621; 349/65; 349/69

(58) Field of Classification Search
USPC ............... 349/65, 69; 362/608–621; 313/512
See application file for complete search history.

(56) References Cited

U.S. PATENT DOCUMENTS

| | | | | |
|---|---|---|---|---|
| 5,786,665 | A * | 7/1998 | Ohtsuki et al. | 313/512 |
| 2002/0163302 | A1 * | 11/2002 | Nitta et al. | 313/512 |
| 2007/0076433 | A1 * | 4/2007 | Kinoshita et al. | 362/615 |
| 2007/0262339 | A1 * | 11/2007 | Hussell et al. | 257/99 |
| 2008/0151142 | A1 * | 6/2008 | Noba | 349/65 |
| 2012/0182765 | A1 * | 7/2012 | Yeo et al. | 362/613 |

FOREIGN PATENT DOCUMENTS

| | | |
|---|---|---|
| JP | 1993-075736 | 3/1993 |
| JP | 07-178833 | 7/1995 |
| KR | 10-2004-0060299 A | 7/2004 |
| KR | 10-2006-0070329 A | 6/2006 |
| KR | 10-2006-0104795 A | 10/2006 |

\* cited by examiner

*Primary Examiner* — Andrew Coughlin
(74) *Attorney, Agent, or Firm* — Lee & Morse, P.C.

(57) ABSTRACT

A liquid crystal display device including a a panel having a liquid crystal layer, and a backlight unit coupled to the panel, for irradiating light to the panel, wherein the backlight unit includes a light source, a light guide plate configured to guide light emitted from the light source to the panel, and a fill spacer in a gap between the light source and a light-incident surface of the light guide plate, the fill spacer including a UV curable material or a thermoplastic elastic material.

5 Claims, 3 Drawing Sheets

LIQUID CRYSTAL DISPLAY DEVICE AND METHOD OF MANUFACTURING THE SAME

CROSS-REFERENCE TO RELATED PATENT APPLICATION

This application claims the benefit of Korean Patent Application No. 10-2011-0094284, filed on Sep. 19, 2011, in the Korean Intellectual Property Office, the disclosure of which is incorporated herein in its entirety by reference.

BACKGROUND

1. Field

The embodiments relate to a liquid crystal display device and a method of manufacturing the same.

2. Description of the Related Art

In general, liquid crystal display (LCD) devices are representative flat panel display devices in which the amount of light transmission is adjusted to correspond to an image signal, thereby displaying an image. In particular, LCD devices have been widely used in various applications due to their advantages: light weight, thin profile, low power consumption driving, and the like.

An LCD device includes a panel that includes a first substrate, a second substrate, and a liquid crystal layer interposed between the first and second substrates and a backlight unit that provides a backlight to the panel. In this regard, the first substrate includes a thin film transistor (TFT) and thus is also referred to as a TFT substrate, and the second substrate includes a color filter and thus is also referred to as a color filter substrate.

Thus, light that is provided by the backlight unit selectively transmits through the liquid crystal layer in which the amount of light transmission is controlled by the TFT and then transmits through the color filter, thereby displaying an image of a predetermined color.

The backlight unit includes a light source from which light is emitted and a light guide plate that guides light emitted from the light source to the panel.

SUMMARY

One or more embodiments may provide a liquid crystal display device, including a panel having a liquid crystal layer; and a backlight unit coupled to the panel, for irradiating light to the panel, wherein the backlight unit includes a light source, a light guide plate configured to guide light emitted from the light source to the panel, and a fill spacer in a gap between the light source and a light-incident surface of the light guide plate, the fill spacer including a UV curable material or a thermoplastic elastic material.method of manufacturing the same.

The UV curable material may be UV silicon. A viscosity of the UV silicon may be in a range of 100 to 2,000 cps.

The thermoplastic elastic material may be thermoplastic elastomer (TPE) or thermoplastic polyurethane elastomer (TPU). The TPE and the TPU each may have a Shore hardness of 30 or less.

One or more embodiments may provide a method of manufacturing a liquid crystal display device including: forming a fill spacer in a semi-cured state on a light-incident surface of a light guide plate; positioning the light guide plate in a backlight unit such that the fill spacer is coupled to a light source, the fill spacer completely filling a space between the light source and the light guide plate; and completely curing the fill spacer.

Forming of the fill spacer may include providing a UV curable material on the light-incident surface of the light guide plate and irradiating UV rays onto the UV curable material to achieve a semi-cured state of the UV curable material.

The UV curable material may be UV silicon. A viscosity of the UV silicon may be in a range of 100 to 2,000 cps.

Forming the fill spacer may include injection molding a thermoplastic elastic material on the light-incident surface of the light guide plate.

The thermoplastic elastic material may be thermoplastic elastomer (TPE) or thermoplastic polyurethane elastomer (TPU). The TPE and the TPU each may have a Shore hardness of 30 or less. The light guide plate may be formed by injection molding. Positioning the light guide plate may include pressing the light guide plate against the fill spacer coupled to the light source.

BRIEF DESCRIPTION OF THE DRAWINGS

The above and other features and advantages of the embodiments will become more apparent by describing in detail exemplary embodiments thereof with reference to the attached drawings in which.

DETAILED DESCRIPTION

Exemplary embodiments will now be described in detail with reference to the accompanying drawings.

Figure 1:
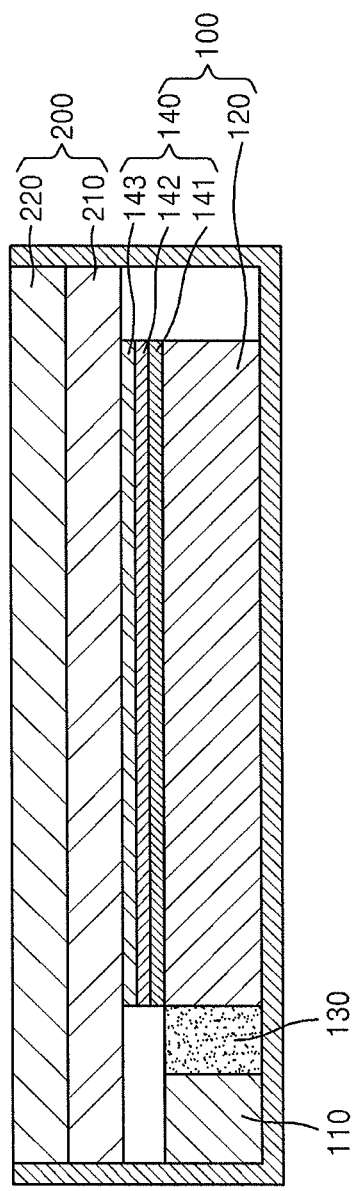
FIG. 1 illustrates a cross-sectional view of a liquid crystal display (LCD) device according to an embodiment.

FIG. 1 illustrates a cross-sectional view of a liquid crystal display (LCD) device according to an embodiment.

Referring to FIG. 1, the LCD device may include a panel 200 that displays an image and a backlight unit 100 that provides light to the panel 200. Light provided by the backlight unit 100 may selectively transmit through the panel 200, thereby forming an image.

The backlight unit 100 may include a light source 110, a light guide plate 120, a fill spacer 130 interposed between the light source 110 and the light guide plate 120, and an optical sheet 140 disposed on the light guide plate 120.

The light guide plate 120 may guide light emitted from the light source 110 towards the panel 200 via the optical sheet 140. The fill spacer 130 may be interposed between the light source 110 and the light guide plate 120 without a gap therebetween. For example, an air-tight connection may be achieved between the fill spacer 130 and the light source 110, and between the fill spacer 130 and the light guide plate 120. As such, loss of light that may occur in a light-guiding process may be significantly decreased. The fill spacer 130 may include a UV curable material, such as UV silicon, or a thermoplastic elastic material, such as thermoplastic elastomer (TPE) or thermoplastic polyurethane elastomer (TPU). A method of forming the fill spacer 130 will be described below.

The optical sheet 140 may allow light emitted from the light guide plate 120 to be incident on the panel 200. The optical sheet 140 may include a diffusion sheet 141 that diffuses light, a prism sheet 142 that alters an angle of light that passes therethrough such that the light is perpendicular to the panel 200, and a protection sheet 143 that protects a surface of the prism sheet 142.

The panel 200 may include a thin film transistor (TFT) substrate 210 (hereinafter, referred to as a first substrate) and a color filter substrate 220, hereinafter, referred to as a second substrate) that are attached to each other, with a liquid crystal layer 230 (refer to FIG. 2) therebetween.

Figure 2:
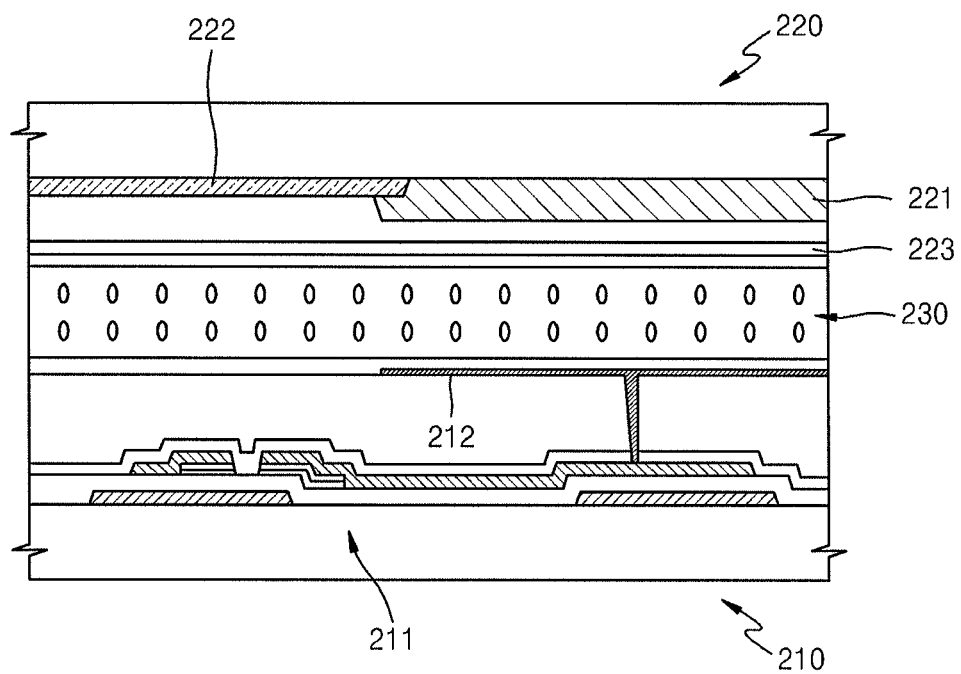
FIG. 2 illustrates an enlarged cross-sectional view of a panel of the LCD device of FIG. 1, according to an embodiment.

FIG. 2 illustrates an enlarged view of a structure of the first and second substrates 210 and 220. Referring to FIG. 2, the first substrate 210 may include a TFT 211 and a pixel electrode 212.

The second substrate 220 may include a color filter 221 for color display, a black matrix 222 for preventing light leakage, and a common electrode 223 facing the pixel electrode 212 of the first substrate 210.

A voltage between the pixel electrode 212 and the common electrode 223 may be controlled by the TFT 211 of the first substrate 210, and an arrangement of liquid crystals of the liquid crystal layer 230 may vary in response thereto. Accordingly, light emitted from the backlight unit 100 may be selectively transmitted through the liquid crystal layer 230, and the transmitted light may then be transmitted through the color filter 221 of the second substrate 220, thereby displaying an image of a predetermined color.

Hereinafter, a method of manufacturing the LCD device, which may include forming the fill spacer 130, will be described.

First, the light guide plate 120 of the backlight unit 100 may be prepared.

The fill spacer 130 may be formed on a light-incident surface 121 of the light guide plate 120. The fill spacer 130 may be formed as illustrated in FIG. 3A or 3B.

Figure 3A:
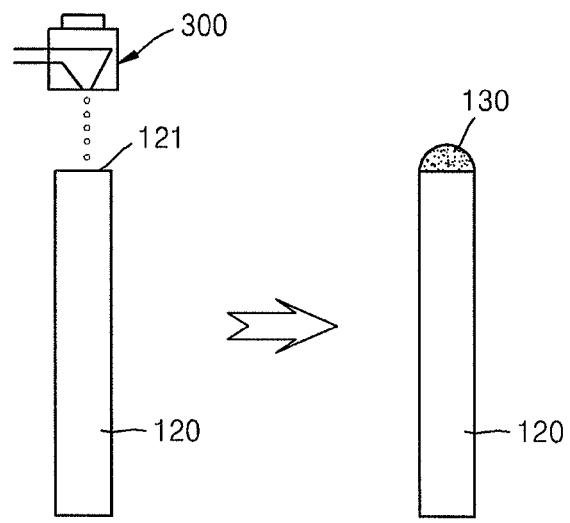
FIGS. 3A and 3B illustrate a process of forming a fill spacer on a light guide plate of the LCD device of FIG. 1, according to an embodiment.
Figure 3B:
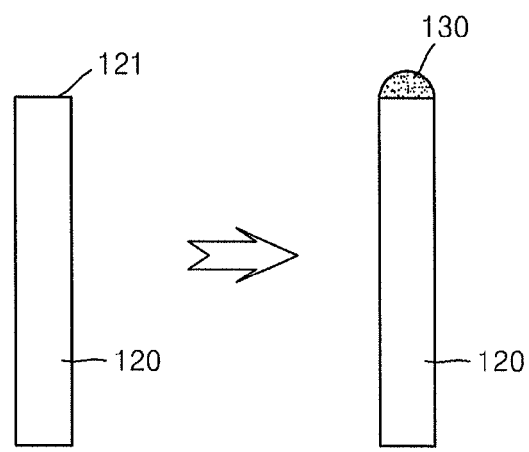

According to some embodiments, as illustrated in FIG. 3A, the fill spacer 130 may be formed on a light-incident surface 121 of the light guide plate 120 from a UV curable material, such as UV silicon, by using a micro dispenser 300. According to some embodiments, as illustrated in FIG. 3B, the fill spacer 130 may be formed on the light-incident surface 121 of the light guide plate 120 from a thermoplastic elastic material, such as TPE or TPU, by an injection molding process. In an implementation, before the light guide plate 120 is installed in the backlight unit 100, the fill spacer 130 may be formed on the light-incident surface 121 of the light guide plate 120. The fill spacer 130, including the UV curable material or the thermoplastic elastic material illustrated in FIGS. 3A and 3B, may be in a semi-cured state. In other words, with reference to FIG. 3A, UV silicon, for example, may be coated on the light-incident surface 121 of the light guide plate 120. UV rays may be irradiated onto the UV silicon, which may cause the UV silicon to be in a semi-cured state. An assembly process may be performed subsequently, before the semi-cured UV silicon is completely cured. With reference to FIG. 3B, TPE or TPU may be formed on the light-incident surface 121 of the light guide plate 120 by injection molding. An assembly process may be performed subsequent, before the TPE or TPU is completely cured.

Figure 4:
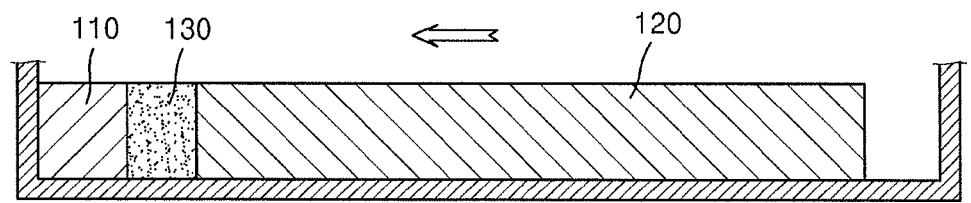
FIG. 4 illustrates a process of positioning a light guide plate with a fill spacer formed thereon in a backlight unit, according to an embodiment.

After the fill spacer 130 is formed on the light guide plate 120, the light guide plate 120 with the fill spacer 130 formed thereon in the semi-cured state (as described above) may be positioned next to the light source 110 of the backlight unit 100, as illustrated in FIG. 4.

Since the fill spacer 130 is in the semi-cured state, the fill spacer 130 may be elastically deformable. Thus, when the light guide plate 120 is pushed against the light source 110 during positioning of the light guide plate 120, the fill spacer 130 may be pressed securely against the light source 110, to fully fill a gap between the light source 110 and the light guide plate 120. In contrast, if the light source 110 and the light guide plate 120 are first positioned at a desired position, and the material for farming the fill spacer 130 is then provided in a gap between the light source 110 and the light guide plate 120 and allowed to solidify, the gap therebetween may not be fully filled, resulting in unfilled portions in the gap. According to the embodiments, however, the fill spacer 130 may be previously formed on the light guide plate 120, and the light guide plate 120 may be pushed against the light source 110 when the fill spacer 130 is in a semi-cured state. As such, the gap between the light source 110 and the light guide plate 120 may be fully and securely filled by the fill spacer 130.

Subsequently, i.e., after the light guide plate 120 is positioned adjacent the light source 110 as previously described, the fill spacer 130 may be completely cured naturally and the optical sheet 140 and the panel 200 may be disposed on the light guide plate 120, thereby completing the manufacture of the LCD device as illustrated in FIG. 1.

By using the method of manufacturing the LCD device, as described above, the gap between the light source 110 and the light guide plate 120 may be fully filled by the fill spacer 130 and loss of light may be stably suppressed. As a result, the manufactured LCD device may have improved luminance.

When UV silicon is used as a material for forming the fill spacer 130, the viscosity of the UV silicon may be in the range of 100 to 2,000 cps. When the viscosity of the UV silicon is not within this range, it may be difficult to maintain the UV silicon in an elastically deformable, semi-cured state.

In addition, when TPE or TPU is used as a material for forming the fill spacer 130, the material may have a Shore hardness of 30 or less. If the hardness of the material is too high, it may be difficult to maintain the TPE or TPU in an elastically deformable, semi-cured state.

When the material for forming the fill spacer 130 includes the features described above, the material may be maintained in an elastically deformable, semi-cured state, and a gap between the light source 110 and the light guide plate 120 may be stably and fully filled. Thus, loss of light may be minimized.

In a conventional LCD device, a gap generally exists between a light source and a light guide plate. Due to the gap between the light source and the light guide plate, a large amount of light is lost in the process of guiding light emitted from the light source to the panel, and thus, the amount of light that transmits through the panel decreases. Consequently, the luminance of an LCD device, including the backlight unit, is deteriorated.

In contrast, embodiments may provide a method of minimizing optical loss in a backlight unit. According to some embodiments, when a liquid crystal display device, manufactured using the method described above, is used, a gap between the light source and the light guide plate may be fully filled by the fill spacer. Thus, loss of light is prevented and, as a result, the LCD device has improved luminance.

While the embodiments have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a liquid crystal display device, the method comprising:

forming a fill spacer in a semi-cured state on a light-incident surface of a light guide plate wherein forming the fill spacer includes injection molding a thermoplastic elastic material in a semi-cured state onto the light-incident surface of the light guide plate, the fill spacer being elastically deformable in the semi-cured state;

after forming the fill spacer in the semi-cured state on the light-incident surface of the light guide plate, positioning the light guide plate having the fill spacer in the semi-cured state formed thereon in a backlight unit such that the fill spacer is coupled to a light source, the fill spacer completely filling a space between the light source and the light guide plate; and completely curing the fill spacer.

2. The method of claim 1, wherein the thermoplastic elastic material is thermoplastic elastomer (TPE) or thermoplastic polyurethane elastomer (TPU).

3. The method of claim 2, wherein the TPE and the TPU each have a Shore hardness of 30 or less.

4. The method of claim 1, wherein the light guide plate is formed by injection molding.

5. The method of claim 1, wherein positioning the light guide plate includes pressing the light guide plate having the fill spacer in the semi-cured state formed thereon against the light source such that the fill spacer is pressed against the light source.

* * * * *